Patented Nov. 22, 1949

2,489,152

UNITED STATES PATENT OFFICE 2,489,152

SODIUM BIFLUORIDE COMPOSITION

Frank W. Panepinto, Philadelphia, Pa., assignor to The Pennsylvania Salt Manufacturing Company, Philadelphia, Pa., a corporation of Pennsylvania No Drawing. Application April 19, 1947, Serial No. 742,735

2 Claims. (Cl. 252—142)

This invention relates to a sodium bifluoride composition having new properties and the method of making this composition.

Comminuted solid products of high bulking volume, i. e. low bulk density, are considered desirable in various applications. It is customary to obtain such products, e. g. in the production of insulating materials, by producing the material in the first instance in a particle form of high bulking volume, e. g. by spray-drying to obtain the material in hollow globular particle form. I am not aware that the incorporation of addition agents has ever been suggested to produce a high bulking volume product. It is known to incorporate addition agents in comminuted solid products for other reasons. Thus magnesium carbonate has been incorporated in table salt to make it non-caking and free flowing, and for other applications glycerin has similarly been incorporated in a salt such as sodium chloride to produce a non-caking mass of moist appearance.

Sodium bifluoride is a material which when ordinarily produced in solid comminuted form has a bulk specific gravity of approximately .8 in loose form and approximately 1.2 in packed form. It is desirable in some applications to have sodium bifluoride of higher bulking volume, for example, in such applications as the use of the material in laundry sour compositions. The product for these uses is ordinarily added with a measuring cup. Slight variations in the quantity of the greater bulking material have a smaller effect and therefore produce a more uniform performance than similar variations in the quantity of the heavier or lower bulking material. I have found no methods suggested in the literature for securing sodium bifluoride in high bulking volume. Particularly there has been no suggestion that admixture of a small amount of a closely related solid bifluoride could produce a much lower bulk density form of sodium bifluoride.

I have now discovered that incorporation of a small amount of ammonium bifluoride in sodium bifluoride greatly reduces the bulk density of the sodium bifluoride. A substantial reduction in bulk density may be obtained by incorporating as little as about 5% by weight of ammonium bifluoride in the sodium bifluoride, and amounts of ammonium bifluoride ranging up to about 15% may be incorporated in the sodium bifluoride, with further marked decrease in the bulk density. The resulting composition thus contains from about 85% to 95% sodium bifluoride, and is regarded in commerce as consisting essentially of sodium bifluoride.

The resulting product in bulk form appears to be a mass of discrete agglomerates, in each of which a number of individual sodium bifluoride particles appear to be loosely adhered one to another in a spatial relationship such that a minimum of the surface of each particle is in contact with other particles. This means that the interstitial space is at a maximum. Sodium bifluoride, in this new physical form, is herein referred to as a mass of porous agglomerates. It is particularly surprising that a small proportion of another solid in powder form, such as ammonium bifluoride, will cause powdered sodium bifluoride to form these porous agglomerates.

In some instances the incorporation of ammonium bifluoride in sodium bifluoride increases the bulking volume of the powder in loose form to a greater degree than in packed form. It may be desirable for some marketing purposes not to alter greatly the ratio of the packed bulk density to the loose bulk density; i. e. it may be more desirable to reduce each of these bulk densities by approximately the same proportion. I have found that this can be readily accomplished by incorporating in addition to ammonium bifluoride a small amount of a wetting agent, preferably from 0.1 to 5% by weight of a surface active agent which is the sodium sulfate derivative of an aliphatic long chain alcohol, such as the "Tergitols."

In a preferred method of practicing my invention and preparing the new composition of my invention, solid sodium bifluoride of small particle size, e. g. a material passing 35 mesh and retained on 325 mesh approximately, is thoroughly mixed with about 5 to 10% by weight of similarly finely divided ammonium bifluoride. The mixing is preferably accomplished by mulling or ball-milling. As will be seen from the data tabulated below, by this method there may be obtained a new sodium bifluoride product of high bulking volume.

The following examples are illustrative of the product and process of my invention.

For these examples finely divided solid sodium bifluoride of particle size approximately —35 to +325 mesh was employed. The bulk density characteristic of the product before treatment in accordance with my invention were as follows:

| | |
|---|---|
| Specific gravity of mortar mixed material—loose | .763 |
| Specific gravity of mortar mixed material—packed | 1.137 |
| Ratio of packed to loose values | 1.49 |
| Specific gravity of Raymond-milled material—loose | .671 |
| Specific gravity of Raymond-milled material—packed | 1.220 |
| Ratio of packed to loose values | 1.82 |

The above material was thoroughly mixed with varying amounts of ammonium bifluoride of approximately the same degree of fineness in a series of preparations as tabulated below. The resulting change in specific gravity is shown in the table.

| Example No. | Amount of $NH_4HF_2$ | Bulk Specific Gravity | | | | | |
|---|---|---|---|---|---|---|---|
| | | Mortar-mixed | | | Raymond-milled | | |
| | | Loose | Packed | Ratio, packed/loose | Loose | Packed | Ratio, packed/loose |
| | None | .763 | 1.137 | 1.49 | .671 | 1.220 | 1.82 |
| 1 | 5% $NH_4HF_2$ | .662 | 1.137 | 1.72 | .630 | 1.010 | 1.61 |
| 2 | 10% $NH_4HF_2$ | .627 | 1.100 | 1.75 | .635 | .980 | 1.54 |
| 3 | 15% $NH_4HF_2$ | .606 | 1.088 | 1.80 | .614 | .894 | 1.45 |

The new composition of my invention may be defined as a mixture of finely divided sodium bifluoride and ammonium bifluoride, the ammonium bifluoride being present in minor proportion, preferably making up from about 5 to 15% by weight of the mixture, said mixture being in the form of a mass of porous agglomerates, the mass having a bulk specific gravity under .67, usually under .65, in loosely packed form.

As above stated, other materials such as wetting agents may also be present in the composition of my invention and the term "composition consisting essentially of sodium bifluoride" and similar expressions found in the claims are intended to include compositions containing such additional ingredients.

Since many modifications are possible in the process and product of my invention as above described without departing from the scope of the invention, it is intended that the above description of my invention should be interpreted as illustrative, and the invention is not to be limited except as set forth in the claims which follow.

I claim:
1. A composition consisting essentially of sodium bifluoride and containing from about 5 to about 15% by weight, based on the sodium bifluoride, of ammonium bifluoride, said composition having a bulk specific gravity less than .67 in loose form.
2. A composition consisting essentially of sodium bifluoride and from about 5 to about 15% by weight, based on the sodium bifluoride, of ammonium bifluoride, said composition being in the form of a mass of discrete porous agglomerates of bulk specific gravity less than .67 in loosely packed form.

FRANK W. PANEPINTO.

REFERENCES CITED

The following references are of record in the file of this patent:

UNITED STATES PATENTS

| Number | Name | Date |
|---|---|---|
| 1,989,312 | Gerber | Jan. 29, 1935 |
| 2,241,580 | Bishop | May 31, 1941 |